United States Patent [19]

Davé

[11] 4,066,795

[45] Jan. 3, 1978

[54] FRESH MUSHROOM TREATMENT

[75] Inventor: Bhalchandra Anantray Davé, Glendora, Calif.

[73] Assignee: Pennwalt Corporation, Philadelphia, Pa.

[21] Appl. No.: 745,269

[22] Filed: Nov. 26, 1976

[51] Int. Cl.$^2$ ........................ A23L 1/272; A23B 7/14; A23B 7/04
[52] U.S. Cl. .................................. 426/259; 426/269; 426/335; 426/532; 426/615
[58] Field of Search ............... 426/254, 259, 269, 310, 426/335, 532, 615

[56] References Cited

U.S. PATENT DOCUMENTS

| | | | |
|---|---|---|---|
| 2,522,535 | 9/1950 | Pryor | 426/335 |
| 2,531,463 | 11/1950 | Pryor et al. | 426/335 |
| 3,231,395 | 1/1966 | Duggan et al. | 426/269 |

*Primary Examiner*—Jeanette M. Hunter

[57] ABSTRACT

Fresh mushrooms are given improved shelf-life by controlled sequential treatments with an aqueous buffered chlorine solution and an aqueous sulfur dioxide solution; thereafter, the mushrooms are dried and stored without freezing at reduced temperature and high humidity.

8 Claims, No Drawings

FRESH MUSHROOM TREATMENT

This invention concerns a method for increasing the shelf-life of fresh mushrooms without freezing.

Fresh mushrooms are usually sold commercially without processing since contact with water produces slime and discoloration thereby reducing the marketability of the product and substantially decreasing its shelf-life. Without processing, the adhering soil and dirt remain on the mushrooms making them unattractive in appearance and carriers of micro-organisms which are the cause of sliminess and discoloration and may be pathogenic to humans.

In accordance with the present invention the soil is removed from mushrooms without resulting in sliminess and discoloration in the storage thereof and the shelf-life of the mushrooms is increased by employing a method wherein fresh mushrooms are first washed with an aqueous, free-chlorine containing solution in an amount sufficient to remove adhered soil and at a solution concentration of free-chlorine sufficient to reduce slime forming organisms thereon, and then the chlorine-treated mushrooms are treated with an aqueous solution containing sulfur dioxide at a concentration sufficient to neutralize chlorine present and to whiten the mushrooms. The excess moisture from the aqueous treatment is promptly removed from the mushrooms and they are preferably stored at reduced temperature ranging down to about 0° C. and at high relative humidity.

In order to provide an effective treatment with lower concentrations of sulfur dioxide, the chlorine-treated mushrooms are usually drained of excess chlorine solution and may also be damp dried, for example, by contact with an absorbent material.

While the treatment of mushrooms may be accomplished at a chlorine concentration ranging from about 50 to about 400 parts per million, the preferred aqueous chlorine treatment is carried out at a free-chlorine concentration of between about 100 and about 150 parts per million. The aqueous solution is buffered to a pH of between about 5 and about 7 using known innocuous buffering agents, for example, potassium monobasic phosphate. The free-chlorine is supplied as a gas or is generated in situ, for example, from alkali- and alkaline earth metal hypochlorites, in solution.

The aqueous sulfur dioxide treatment is carried out using sulfur dioxide gas supplied directly to the aqueous medium, or an alkali salt of sulfurous acid, such as sodium bisulfite and sodium metabisulfite or potassium metabisulfite, is employed to generate the sulfur dioxide in situ. Because of its availability, sodium bisulfite is the preferred compound to produce sulfur dioxide and it is used at a concentration of about 0.1 to about 0.8% preferably from about 0.2 to about 0.3% based on the weight of the solution.

The aqueous treatment may be applied to the mushrooms by a dip or spray system. When using a spray system, care should be taken to obtain complete coverage of the solutions over the mushrooms in order to obtain the desired results.

The temperature of the aqueous treating solutions is preferably between about 1.5° and 12.5° C.

Damp drying or at least draining of the solution between treatments is preferred to make certain that sufficient sulfur dioxide is present during the second treatment to provide the desired whitening of the mushrooms after neutralization of the chlorine from the first treatment. Draining of the free-chlorine solution is generally sufficient to remove excess chemical after a spray treatment.

Damp drying may be employed after the second treatment, if necessary, in order to remove excess chemical from the surface of the mushroom before storage.

Storage of the mushrooms, after the aqueous treatments, is carried out at temperatures ranging from about 0° up to about 8° C., preferably closer to 0° C. and at a relative humidity of at least about 80%, preferably 95%.

The following example is set forth to demonstrate the method of this invention.

EXAMPLE

Creamy-white, fresh mushrooms were treated with chlorinated water having a temperature of 4.5° C. by immersing the mushrooms in the water for one minute. The chlorinated water contained 100 parts per million of free-chlorine, furnished by the addition of sodium hypochlorite (NaOCl) to the water, and was buffered to a pH of 6.0 with 1.0 weight % potassium monobasic phosphate (adjusted with sodium hydroxide).

The chlorine-treated mushrooms were immediately drained and damp dried on paper towels, and then immersed in a 0.2 weight % sodium bisulfite solution in water at 4.5° C. for one minute. After removal from this solution, the mushrooms were drained, damp dried with paper towels and promptly stored at 0° C. and 95% relative humidity.

The clean, attractive mushrooms remained firm and white up to 7 - 10 days compared to untreated soiled mushrooms which had a shelf-life of about 3 - 4 days under the same storage conditions.

As previously mentioned, the mushroom industry has avoided the use of contact with water and a literature survey indicates several unsuccessful attempts in obtaining cleaner mushrooms. Treatment with chlorinated water alone will not prevent fresh mushrooms from darkening. In a cannery, chlorinated wash-water by itself is used for cleaning mushrooms primarily prior to the heating operations. Under these conditions darkening or chemical injury is of no great concern since heat treatment will, in any event, cause a similar darkened product. Mushrooms for the fresh market can not tolerate any darkening. Mushrooms receiving the sulfur dioxide treatment alone appear whiter but such treatment does not have the cleaning and sanitizing effect of a chlorine wash hence, mushrooms treated solely with sulfur dioxide get mushier during subsequent storage. In view of the above, the two chemical treatments are combined to achieve highly desirable and unexpected results.

The mushroom treatment process described herein gives a simple and safe method for making available cleaner, whiter mushrooms with extended shelf-life not available before. The use of the first chemical treatment provides a reduction of soil level and slime forming microorganisms with consequent elimination of health hazard and further deterioration of the produce due to such microorganisms. The second chemical treatment in the process neutralizes residual chlorine and makes a whiter product with extended shelf-life not attainable by methods previously attempted.

The dual chemical treatment is applicable by either dipping or spraying the required solutions and thus makes a feasible process for continuous operation for obtaining clean mushrooms.

Because a cleaner product with added shelf-life is provided, the growers and shippers will have more marketability of fresh mushrooms than with comparable untreated mushrooms. The treated product will reduce the number of delivery periods per customer because of extended shelf-life. The customer will also have more flexibility in ordering ahead of time. Instead of selling dirty, unattractive and discolored mushrooms, retailers can display cleaner, whiter mushrooms and increase their mushroom sales.

I claim:

1. A method for treating fresh mushrooms comprising first washing said mushrooms with an aqueous, free-chlorine containing solution in an amount sufficient to remove adhered soil and at a solution concentration of free-chlorine sufficient to reduce slime forming organisms thereon, then treating said mushrooms with an aqueous solution containing sulfur dioxide at a concentration sufficient to neutralize chlorine present thereon and to whiten said mushrooms, drying said mushrooms and storing the dried mushrooms without freezing at a temperature ranging from 0° to about 8° C. and a relative humidity of at least 80%.

2. The method of claim 1 wherein the excess aqueous, free-chlorine containing solution is drained from said mushrooms prior to the sulfur dioxide treatment.

3. The method of claim 1 wherein the sulfur dioxide is produced by a concentration of dissolved sodium bisulfite in the aqueous solution ranging from about 0.1 to about 0.8% based on the weight of the solution.

4. The method of claim 1 wherein the sulfur dioxide is produced by a concentration of dissolved sodium bisulfite in the aqueous solution ranging from about 0.2 to about 0.3% based on the weight of the solution.

5. The method of claim 1 wherein the free-chlorine in the aqueous solution ranges from about 50 to 400 parts per million.

6. The method of claim 1 wherein the free-chlorine in the aqueous solution ranges from about 100 to about 150 parts per million.

7. The method of claim 2 wherein the free-chlorine in the aqueous solution ranges from about 100 to about 150 parts per million, and is furnished by sodium hypochlorite in said solution, the excess aqueous, free-chlorine containing solution is drained from said mushrooms, and the sulfur dioxide is produced by dissolved sodium bisulfite in the aqueous solution at a concentration ranging from about 0.2 to about 0.3% based on the weight of the solution.

8. The method of claim 7 wherein the aqueous free-chlorine containing solution is buffered to a pH of between about 5 and about 7 and the temperature of each treatment solution ranges from about 1.5° and about 12.5° C.

* * * * *